(12) United States Patent
Farkash et al.

(10) Patent No.: US 9,858,431 B2
(45) Date of Patent: Jan. 2, 2018

(54) SEAMLESS DATA MASKING FOR PAAS BASED APPLICATIONS

(71) Applicant: International Business Machines Corporation, Armonk, NY (US)

(72) Inventors: Ariel Farkash, Shimshit (IL); Igor Gokhman, Haifa (IL); Abigail Goldsteen, Haifa (IL); Micha Moffie, Zichron Yaakov (IL)

(73) Assignee: International Business Machines Coporation, Armonk, NY (US)

( * ) Notice: Subject to any disclaimer, the term of this patent is extended or adjusted under 35 U.S.C. 154(b) by 103 days.

(21) Appl. No.: 14/929,348

(22) Filed: Nov. 1, 2015

(65) Prior Publication Data

US 2017/0124341 A1    May 4, 2017

(51) Int. Cl.
*H04L 29/06* (2006.01)
*G06F 21/62* (2013.01)
*G06F 21/60* (2013.01)

(52) U.S. Cl.
CPC ........ *G06F 21/6209* (2013.01); *G06F 21/606* (2013.01)

(58) Field of Classification Search
CPC ............................ G06F 21/6209; G06F 21/606
USPC .......................................................... 726/30
See application file for complete search history.

(56) References Cited

U.S. PATENT DOCUMENTS

| | | | |
|---|---|---|---|
| 8,341,104 B2 | 12/2012 | Manickam et al. | |
| 8,689,282 B1* | 4/2014 | Oprea | H04L 63/20 726/1 |
| 8,826,370 B2 | 9/2014 | Boukobza | |
| 8,881,224 B2 | 11/2014 | Saxena et al. | |
| 2013/0047230 A1* | 2/2013 | Krishnan | H04L 63/102 726/7 |
| 2013/0179985 A1 | 7/2013 | Strassmann et al. | |
| 2013/0275803 A1* | 10/2013 | Kern | G06Q 10/063112 714/15 |
| 2013/0282697 A1 | 10/2013 | Barbas et al. | |
| 2014/0040185 A1* | 2/2014 | Kache | G06F 17/30365 707/609 |
| 2015/0052218 A1* | 2/2015 | Zhang | G06F 9/4856 709/217 |

FOREIGN PATENT DOCUMENTS

| EP | 13190641.4 | 5/2014 |
|---|---|---|
| WO | 2013136324 | 9/2013 |

OTHER PUBLICATIONS

Admin., "Securing on-premise data through data masking", Jan. 13, 2015, Can be found at: http://www.gallop.net/blog/securing-on-premise-data-through-data-masking.
Conclusion., "Informatica Dynamic Data Masking", White Paper, Nov. 2012.

* cited by examiner

*Primary Examiner* — Michael S McNally
(74) *Attorney, Agent, or Firm* — Daniel Kligler

(57) ABSTRACT

Methods, computing systems and computer program products implement embodiments of the present invention that include defining, for a data masking engine executing in a platform as a service (PaaS) based software environment, one or more data masking rules. Upon detecting, by the data masking engine, data processed by a software application executing within the PaaS based software environment and in accordance with a given data masking rule, the data masking engine can perform a data masking operation on the data.

16 Claims, 3 Drawing Sheets

SEAMLESS DATA MASKING FOR PAAS BASED APPLICATIONS

FIELD OF THE INVENTION

The present invention relates generally to data masking, and specifically to seamlessly masking sensitive data in platform as a service (PaaS) based software environments.

BACKGROUND

Cloud computing services provide powerful environments for customers to develop, run and manage web applications without the complexity of building and maintaining any infrastructure typically associated with developing and launching the applications. Examples of cloud computing services include infrastructure as a service (IaaS), platform as a service (PaaS) and software as a service (SaaS).

PaaS provides an environment for developers and companies to create, host and deploy applications, thereby saving developers from the complexities of the infrastructure side (i.e., initializing, configuring and managing elements such as servers and databases). Additionally, PaaS can improve the speed of developing applications, and allows the developer to focus on the application itself, since the developer manages applications and data, while the PaaS provider manages runtime, middleware, operating system, virtualization, servers, storage and networking.

The description above is presented as a general overview of related art in this field and should not be construed as an admission that any of the information it contains constitutes prior art against the present patent application.

SUMMARY

There is provided, in accordance with an embodiment of the present invention a method, including defining, for a data masking engine executing in a platform as a service (PaaS) based software environment, one or more data masking rules, detecting, by the data masking engine, data processed by a software application executing within the PaaS based software environment and in accordance with a given data masking rule, and performing, by the data masking engine, a data masking operation on the data.

There is also provided, in accordance with an embodiment of the present invention an apparatus, including a memory configured to store in a platform as a service (PaaS) based software environment, and a processor configured to define, in the PaaS based software environment, one or more data masking rules, to detect data processed by a software application executing within the PaaS based software environment and in accordance with a given data masking rule, and to perform a data masking operation on the data.

There is further provided, in accordance with an embodiment of the present invention a computer program product, the computer program product including a non-transitory computer readable storage medium having computer readable program code embodied therewith, the computer readable program code including computer readable program code configured to initialize, by a hypervisor, first and second virtual machines, computer readable program code configured to define, for a data masking engine executing in in a platform as a service (PaaS) based software environment, one or more data masking rules, computer readable program code configured to detect, by the data masking engine, data processed by a software application executing within the PaaS based software environment and in accordance with a given data masking rule, and computer readable program code configured to perform, by the data masking engine, a data masking operation on the data.

BRIEF DESCRIPTION OF THE DRAWINGS

The disclosure is herein described, by way of example only, with reference to the accompanying drawings, wherein.

DETAILED DESCRIPTION OF EMBODIMENTS

Dynamic data masking is designed to secure sensitive data in real-time, and can be used by both live production and non-live (e.g., test) systems. Dynamic data masking masks all sensitive data as the data is accessed, thereby enabling users to work with the application without viewing the sensitive data. For example, in financial service systems, dynamic data masking can be used to enforce automatic adherence to Payment Card Industry Data Security Standard (PCI DSS) regulations while presenting consumer data to a developer or a user.

Embodiments of the present invention provide methods and systems for seamlessly integrating dynamic data masking in Platform as a Service (PaaS) based software applications. As described hereinbelow, a PaaS based software environment can be initialized by defining one or more data masking rules for a data masking engine executing in the PaaS based software environment. Upon the data masking engine detecting data processed by a software application executing within the PaaS based software environment and in accordance with a given data masking rule, the data masking engine performs a data masking operation on the data.

Systems implementing embodiments of the present invention can instantly and transparently perform dynamic data masking for PaaS based applications by seamlessly monitoring application endpoints supplied by the PaaS infrastructure (e.g., by monitoring inbound and outbound traffic), and applying dynamic data masking rules and policies on-the-fly in order to prevent the exposure of sensitive data to unauthorized users. Additionally, by offering data masking services that do not require any changes to a PaaS based application, a PaaS environment can provide scalability, availability and fail-over to both the application and the data masking service, thereby enabling the PaaS to scale the application and the data masking service in tandem to match current load requirements.

System Description

Figure 1:
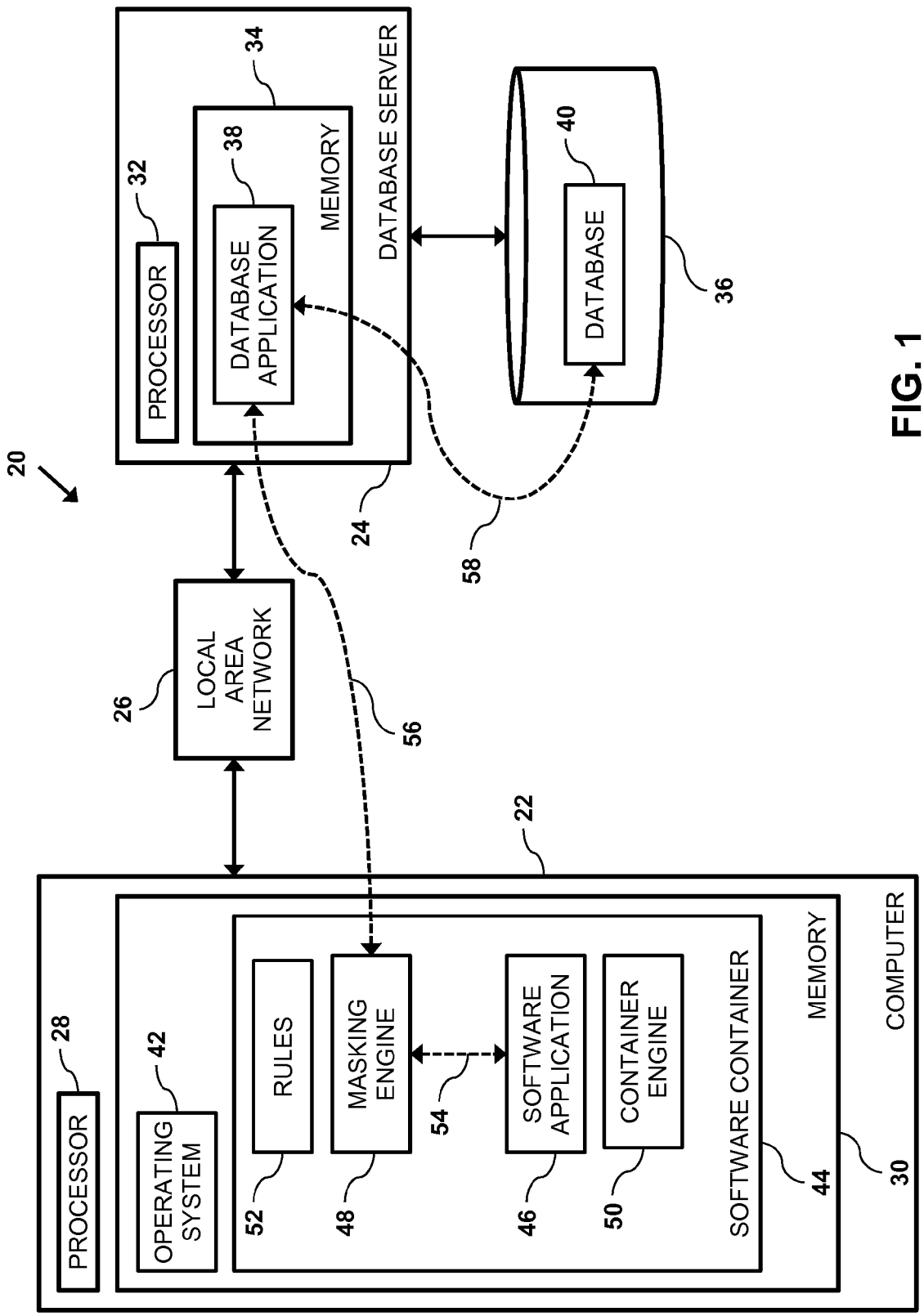
FIG. 1 is a block diagram that schematically illustrates a first example of a computing facility configured to seamlessly mask sensitive data in a platform as a service (PaaS) based software environment, in accordance with an embodiment of the present invention.

FIG. 1 is a block diagram that schematically illustrates a first example of a computing facility 20 comprising a computer 22 and a database server 24 that communicate via a local area network 26, in accordance with an embodiment of the present invention. Computer 22 comprises a data masking processor 28 and a data masking memory 30, and database server 24 comprises a database processor 32, a database memory 34 and a storage device 36 such as a hard disk drive or a solid-state disk drive.

Processor 32 executes, from memory 34 a database management application 38 that manages data stored in a database 40 on storage device 36, and processor 28 executes, from memory 30, an operating system 42 and a software container 44. Software container 44 comprises a software application 46, a data masking engine 48, data masking rules 52, and a container engine 50 that manages execution of the software application and the data masking engine in a PaaS based software environment on a single host system comprising (i.e., in this example) processor 28 and operating system 42.

In embodiments of the present invention, processor 28 executes software application 44 on a PaaS based software environment comprising masking engine 48 that seamlessly provides, for the software application, masking when accessing the data in database 40. While the example in FIG. 1 (and in FIG. 2 described hereinbelow) shows the PaaS based software environment comprising software container 44, other types of PaaS based software environments such as virtual machines are considered to be within the spirit of the invention. In embodiments where the PaaS based software environment comprises a virtual machine, processor 28 executes a hypervisor (not shown) from memory 30, and the hypervisor manages the virtual machine that has a separate instance of operating system 42.

In embodiments where the PaaS based software environment comprises software container 44, the software container (i.e., container engine 50) provides various services to software application 46 and function as a bridge between the application and the PaaS. In operation, container engine 50 forwards client requests to application 46, and receives back responses for sending them back to the originating client. The logical path of data processed by software container 44 is shown by arrows 54, 56 and 58.

Masking engine uses data masking rules 52 to determine which data (i.e., columns) in database 40 needs to be masked using techniques such as encryption, reduction (i.e., compression) and tokenization. For example, in a medical care system, a first given data masking rule 52 may comprise masking a patient's credit card number, and a second given data masking rule 52 may comprise limiting access of a given patient's record to their health care professional.

In embodiments described herein, a data masking policy (not shown) comprises a set of data masking rules 52, and the term data masking rules also refer to data masking policies. A first example of a data policy may comprise applying PCI for bank tellers, and a second example of a data policy may comprise applying PCI to banking consultants. The first and the second example data masking policies may have overlaps in their respective data masking rules 52 (e.g., what types of data they are allowed to see), but they typically comprise different sets of data masking rules.

In the configuration shown in FIG. 1, computing facility 20 can scale the PaaS automatically by adding one or more additional software containers 44. In other words, adding an additional software container 44 automatically adds additional system resources for both software application 46 and masking engine 48.

Figure 2:
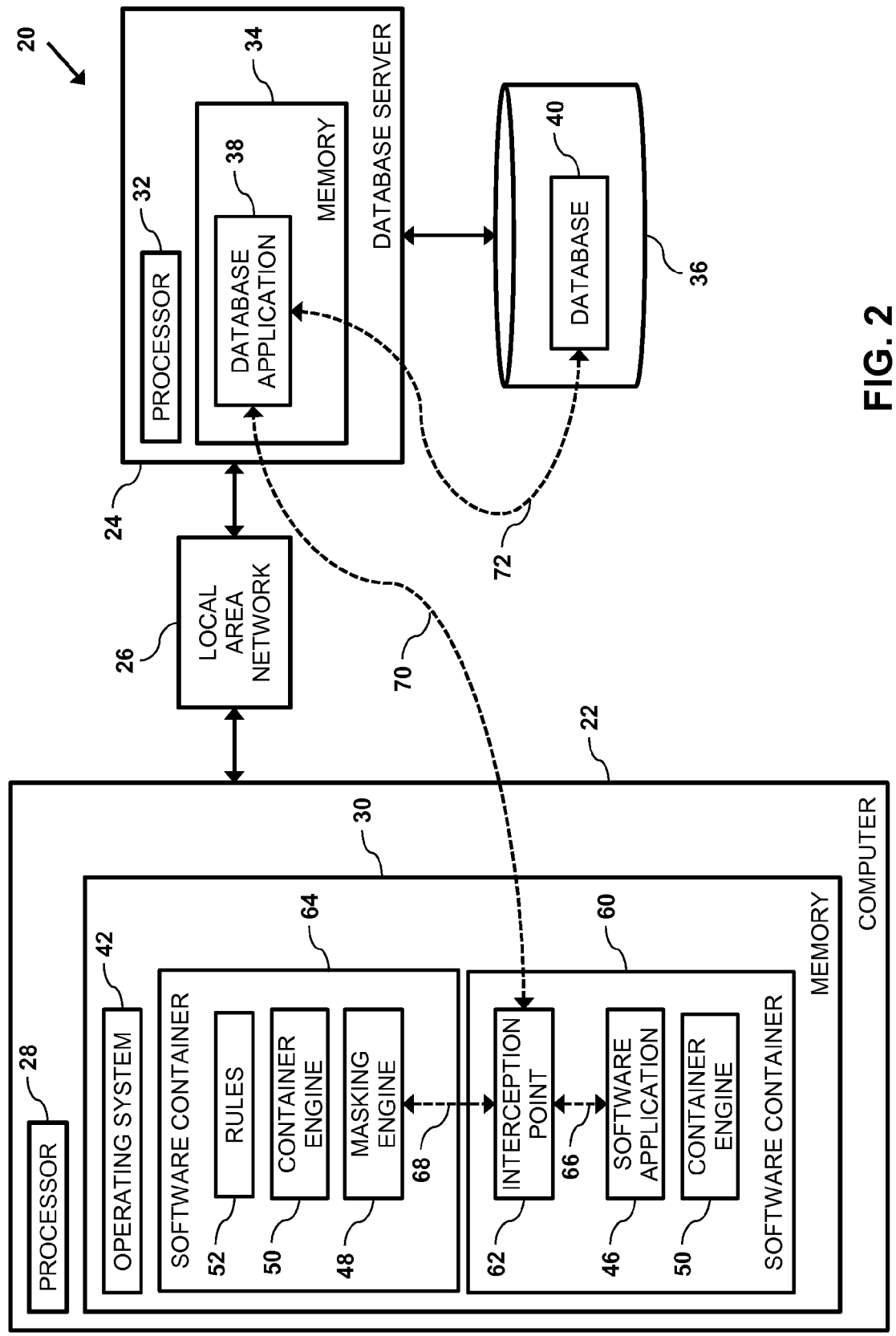
FIG. 2 is a block diagram that schematically illustrates a second example of a computing facility configured to seamlessly mask sensitive data in a PaaS based software environment, in accordance with an embodiment of the present invention.

FIG. 2 is a block diagram that schematically illustrates a second example of a computing facility 20, in accordance with an embodiment of the present invention. In the configuration shown in FIG. 2, memory 30 stores a first container 60 that stores a software application 46, an interception point 62, and a first instance of container engine 50, and a second container 64 that stores masking engine 48, data masking rules 52 and a second instance of container engine 50. In other words, the configuration shown in FIG. 2 uses separate software containers for the software application and the data masking engine.

The logical path of data processed by software containers 60 and 64 is shown by arrows 66, 68, 70, and 72. As indicated by arrows 66-70, interception point 62 is configured as a data interface between software application 46, masking engine 50 and database application 38. As indicated by arrows 66 and 68 in the configuration shown in FIG. 2, interception point 62 enables software application 46 executing in a first PaaS comprising software container 60, to convey data requests to masking engine 50 executing in a second PaaS comprising software container 64.

In the configurations shown in both FIGS. 1 and 2, once a data request payload is processed by masking engine 48, the appropriate container can convey the result to application 46. Likewise, a similar scenario can be applied in the opposite direction, so that upon receiving a response from application 46, the appropriate container can invoke the data masking engine again, and then convey the processed response to its destination.

In some embodiments, the PaaS in computing facility 20 can provide an ability to configure masking rules 52 via an interface such as a command line interface, a graphical user interface and an application programming interface. Using the interface, masking engine 48 can enforce data masking rules 52 on different levels of granularity such as per application basis, user basis or for all the applications on the PaaS.

In additional embodiments, software application 46 can call data masking engine 48 via a wrapper function (not shown) in software containers 44 and 60. In other words the wrapper function provides a data path to couple software application 46 and data masking engine 48. When using a wrapper function, software application 46 does not need to be altered to access the data masking engine via different data paths (either directly or via interception point 62) that are handled by the wrapper function.

In the configuration shown in FIG. 2, computing facility 20 can scale the PaaS by adding one or more additional software containers 60 and/or 64. For example, computing facility 20 can be configured to have one software container 64 for every three software containers 60. In some embodiments, software container comprising masking engine 48 can provide data masking services for additional applications (not shown) executing in the computing facility.

Processors 28 and 32 typically comprise a general-purpose computer, which are programmed in software to carry out the functions described herein. The software may be downloaded to computer 22 and database server 24 in electronic form, over a network, for example, or it may be provided on non-transitory tangible media, such as optical, magnetic or electronic memory media. Alternatively, some or all of the functions of processors 28 and 32 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

PaaS Data Masking

Figure 3:
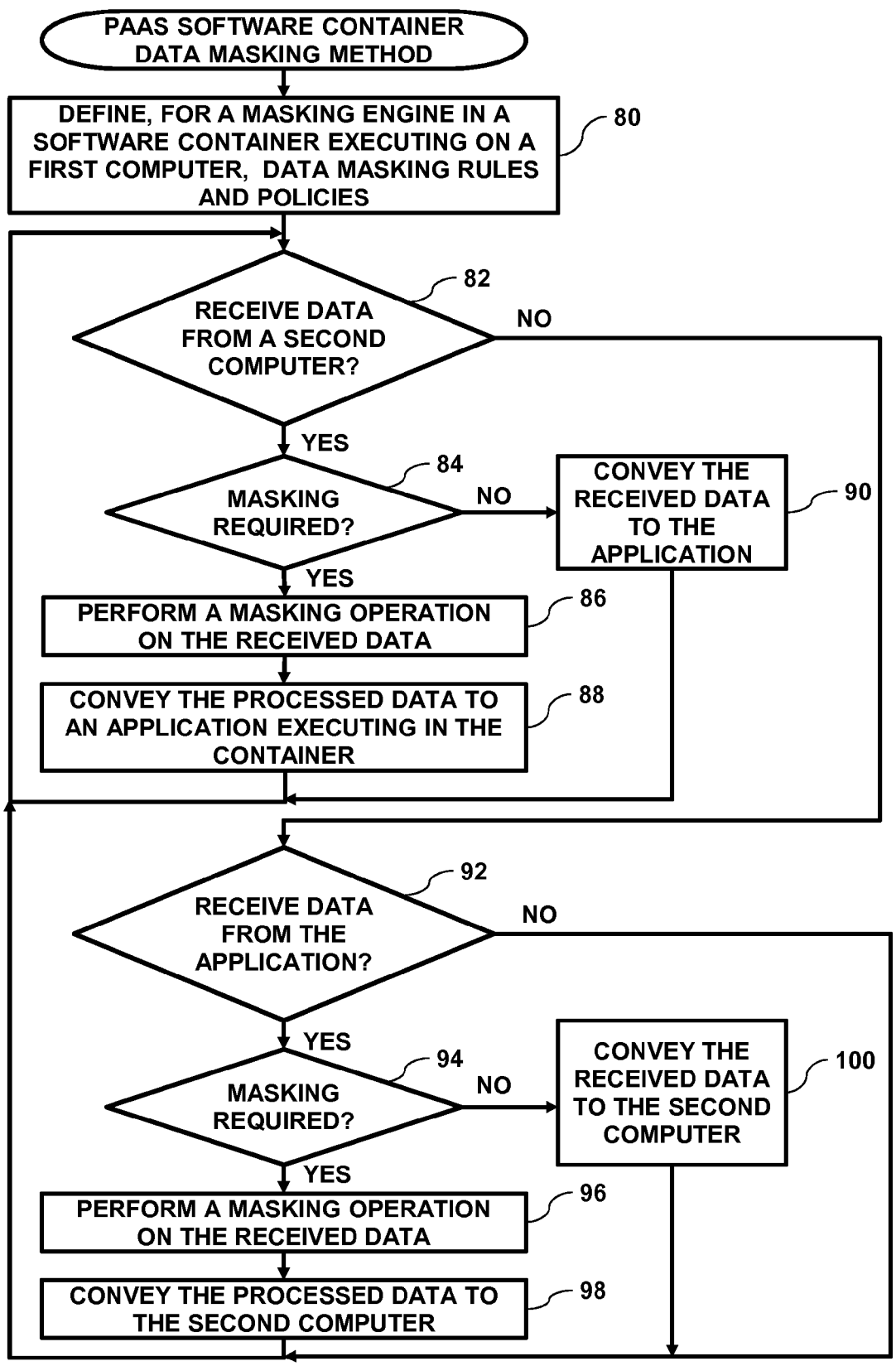
FIG. 3 is a flow diagram that schematically illustrates a method for seamlessly masking data in a PaaS based software environment, in accordance with an embodiment of the present invention.

FIG. 3 is a flow diagram that schematically illustrates a method for masking data accessed by software application 46 that is deployed as a PaaS in computing facility 20, in accordance with an embodiment of the present invention. As described in the flow diagram, masking engine 48 can mask or unmask data between software application 46 and database 40 in both directions. In other words, masking engine can mask or unmask data in response to software application 46 storing the data on database 40, and can mask or unmask data in response to the software application retrieving the data from the database.

In a definition step 80, data masking rules 52 are defined for masking engine 48. For example, processor 28 can receive data masking rules 52 from an additional computer (not shown) coupled to network 26, from an input device (not shown) or from a file (not shown) stored on computer 22, and stored the received data masking rules to memory 30.

In a first comparison step 82, if processor 28 receives data from database server 24 (also referred to herein as a second computer) that is destined for software application 46, then in a second comparison step masking engine 48 determines if a data masking operation (i.e., either masking or unmasking) needs to be performed on the received data. To determine if a data masking operation needs to be performed, masking engine 48 checks if the data is in accordance with any given data masking rule 52. For example if a given data masking rule 52 is to mask credit card numbers and the received data comprises a credit card number, then the received data is in accordance with a given data masking rule, and data masking is required.

If a data masking operation is required, then masking engine 48 performs the data masking operation on the received data in a first masking step 86, conveys the processed (i.e., either masked or unmasked) data to software application 46 in a first convey step 88, and the method continues with step 82. Returning to step 84, if a data masking operation is not required for the received data, then processor 28 conveys the received data to software application 46 in a second convey step 90, and the method continues with step 82.

In embodiments of the present invention, the type of data masking operation may also be indicated by data masking rules 52. For example, each of the data masking rules may indicate if the received data is to be masked using a reversible or a non-reversible data masking method, and if the received data is to be masked using a format preserving or a non-format preserving data masking method.

Returning to step 82, if processor 28 does not receive data from database server 24, then in a third comparison step 92, the data masking processor checks if any there is any data received from software application 46 that needs to be stored in database 40. If processor 28 receives, from software application 46, data to be stored to database 40, then in a fourth comparison step 94, masking engine 48 determines if a masking operation needs to be performed on the received data.

If a data masking operation is required, then masking engine 48 performs the data masking operation on the received data in a second masking step 96, conveys the processed data to database server 24 in a third convey step 98, and the method continues with step 82. Returning to step 94, if a data masking operation is not required for the received data, then processor 28 conveys the received data to database server 24 in a fourth convey step 100, and the method continues with step 82.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   providing a platform as a service (PaaS) software, including a plurality of software environments, on a computer;
   deploying a software application in one of the software environments of the PaaS software;
   executing a data masking engine in one of the software environments of the PaaS software, wherein the data masking engine monitors inbound or outbound traffic of the deployed software application, passing through endpoints of the software application, supplied by the PaaS software;
   defining, for the data masking engine, one or more data masking rules;
   detecting, by the data masking engine, data processed by the software application in accordance with a given data masking rule; and
   performing, by the data masking engine, a data masking operation on the detected data in accordance with the given data masking rule.

2. The method according to claim 1, wherein the plurality of software environments comprise software containers.

3. The method according to claim 1, wherein the data masking operation is selected from a group consisting of masking the data and unmasking the data.

4. The method according to claim 1, wherein the data masking engine is executed in a first software environment, and the software application is deployed in a second software environment, different from the first software environment.

5. The method according to claim 4, wherein the data masking engine is executed in a first software container, and the software application is deployed in a second software container, different from the first software container.

6. The method according to claim 5, wherein the data masking engine masks traffic of a plurality of software applications deployed in a plurality of respective software containers.

7. The method according to claim 1, wherein the data masking engine and the software application are in a same software environment.

8. The method according to claim 1, wherein the data masking engine enforces one or more specific masking rules on traffic of a plurality of software applications.

9. An apparatus, comprising:
a memory configured to store code of a platform as a service (PaaS) software; and
a processor configured:
   to run the code of the PaaS, to provide a PaaS including a plurality of software environments;
   to deploy a software application in one of the software environments of the PaaS software;
   to execute a data masking engine in one of the software environments of the PaaS software, wherein the data masking engine monitors inbound or outbound traffic of the deployed software application, passing through endpoints of the software application, supplied by the PaaS software;
   to define, for the data masking engine, one or more data masking rules,
   to detect data processed by the software application executing in accordance with a given data masking rule, and
   to perform a data masking operation on the detected data in accordance with the given data masking rule.

10. The apparatus according to claim 9, wherein the plurality of software environments comprise software containers.

11. The apparatus according to claim 9, wherein the data masking operation is selected from a group consisting of masking the data and unmasking the data.

12. The apparatus according to claim 9, wherein the data masking engine is executed in a first software environment, and wherein the processor is configured to execute the software application in a second software environment, different from the first software environment.

13. A computer program product, the computer program product comprising:
a non-transitory computer readable storage medium having computer readable program code embodied therewith, the computer readable program code comprising:
   computer readable program code configured to provide a platform as a service (PaaS) including a plurality of software environments, to deploy a software application in one of the software environments of the PaaS software, to execute a data masking engine in one of the software environments of the PaaS software, wherein the data masking engine monitors inbound or outbound traffic of the deployed software application, passing through endpoints of the software application, supplied by the PaaS software, and to define, for the data masking engine one or more data masking rules;
   computer readable program code configured to detect, by the data masking engine, data processed by the software application executing in accordance with a given data masking rule; and
   computer readable program code configured to perform, by the data masking engine, a data masking operation on the detected data in accordance with the given data masking rule.

14. The computer program product according to claim 13, wherein the plurality of software environments comprise software containers.

15. The computer program product according to claim 13, wherein the data masking operation is selected from a group consisting of masking the data and unmasking the data.

16. The computer program product according to claim 13, wherein the PaaS based software environment comprises a first PaaS based software environment, and comprising computer readable program code configured to execute the first software application in a second PaaS based software environment.

* * * * *